United States Patent
Larsen et al.

(10) Patent No.: US 7,390,169 B2
(45) Date of Patent: Jun. 24, 2008

(54) LIGHTNING PROTECTION OF A PITCH-CONTROLLED WIND TURBINE BLADE

(75) Inventors: Flemming Møller Larsen, Christiansfeld (DK); Lars Bo Hansen, Agerskov (DK)

(73) Assignee: LM Glasfiber A/S, Luderskov (DK)

( * ) Notice: Subject to any disclaimer, the term of this patent is extended or adjusted under 35 U.S.C. 154(b) by 231 days.

(21) Appl. No.: 10/534,769

(22) PCT Filed: Nov. 12, 2003

(86) PCT No.: PCT/DK03/00778

§ 371 (c)(1),
(2), (4) Date: Dec. 21, 2005

(87) PCT Pub. No.: WO2004/044419

PCT Pub. Date: May 27, 2004

(65) Prior Publication Data

US 2007/0009361 A1   Jan. 11, 2007

(30) Foreign Application Priority Data

Nov. 12, 2002   (DK) ................................ 2002 01745

(51) Int. Cl.
*F03D 9/00*   (2006.01)
(52) U.S. Cl. .................................... 416/146 R; 416/230
(58) Field of Classification Search ............. 416/146 R, 416/230, 229; 290/44; 361/212, 216, 220
See application file for complete search history.

(56) References Cited

U.S. PATENT DOCUMENTS

2003/0170122 A1\* 9/2003 Wobben ....................... 416/31

FOREIGN PATENT DOCUMENTS

| DE | 44 36 197 A1 | 4/1996 |
| EP | 0 707 145 A1 | 4/1996 |
| EP | 0 718 495 A1 | 6/1996 |
| EP | 1 036 937 A3 | 9/2000 |
| WO | WO 01 86144 A1 | 11/2001 |

\* cited by examiner

*Primary Examiner*—Edward Look
*Assistant Examiner*—Dwayne J White
(74) *Attorney, Agent, or Firm*—Cooper & Dunham LLP

(57) ABSTRACT

A wind turbine rotor including a rotor hub (3) and a plurality of blades (4), and where each blade root (16) is connected to said rotor hub through a pitch bearing (5) in such a manner that the pitch angle of the blade is adjustable by a turning of the blade about its longitudinal axis relative to the rotor hub. The blade is provided with at least one electrically conducting lightening down-conductor (6) extending in the longitudinal direction of the blade to the blade root and being electrically isolated from the pitch bearing (5). A spark gap (15) is provided between the lightning down-conductor and the rotor hub, said spark gap (15) being adapted to conduct a lightning current passing through the lightning down-conductor. A sliding contact connection (7, 12) is provided parallel to the spark gap (15) between the lightning down-conductor (6) and the rotor hub (3), said sliding contact connection ensuring electrical contact between said lightening down-conductor (6) and said rotor hub (3) irrespective of the pitch angle of the blade. The invention also relates to a wind turbine including such a rotor.

19 Claims, 4 Drawing Sheets

LIGHTNING PROTECTION OF A PITCH-CONTROLLED WIND TURBINE BLADE

TECHNICAL FIELD

The invention relates to a wind turbine rotor including a rotor hub and a plurality of blades, and where each blade root is connected to said rotor hub through a pitch bearing in such a manner that the blade is pivotable about its longitudinal axis relative to the rotor hub, and where said blade is provided with at least one electrically conducting lightening down-conductor extending in the longitudinal direction of the blade to the blade root and being electrically isolated from the pitch bearing, and where a spark gap is provided between the lightning down-conductor and the rotor hub, said spark gap being adapted to conduct a lightning current passing through the lightning down-conductor.

Furthermore, the invention relates to a wind turbine with the above wind turbine rotor.

BACKGROUND ART

It is common knowledge that wind turbines are protected against lightning strikes, and it is also common knowledge that wind turbine blades are provided with lightning down-conductors arranged either on the outer surface of the blades or inside said blades. The latter type is provided with so-called lightning receptors, which are metallic through-going connections between the inner lightning down-conductor of the blade and the outer surface of said blade. The purpose of these receptors is to "attract" the lightning so that the lightning current can be guided downwards through the lightning down-conductor mounted inside the wind turbine blade. Often, the wind turbine blades with externally mounted down-conductors are not provided with separate lightning receptors as said down-conductors act as receptors, per se.

Previous ways of solving the down-conducting of lightning have not specifically considered that a pitch bearing, if any, can be damaged by a strong lightning current, and typically the current is conducted through the down-conductor of the blade to the blade root and from there through the pitch bearing to the rotor hub. From the rotor hub, the lightning current is conducted into the nacelle/turbine top section to the turbine tower and downwards into the ground.

One disadvantage of conducting the current through the pitch bearing is that bearing rollers etc. can be damaged by a strong lightning current generating electrical arcs on its way down through the bearing with the result that a welding-like effect occurs which can damage the surface of the bearing. Once the surface of a bearing roller etc. has been damaged, the bearing is quickly worn down, which in time results in large repairs involving shut downs of the wind turbine. Even weak currents passing through the pitch bearing can cause small sparks and migration of material between the pitch bearing members moving relative to each other.

The most common strikes of lightning occur when the potential difference between a negatively charged portion of a thundercloud and a positively charged area of the ground beneath the cloud grows sufficiently significant and causes a breakdown of the isolation of the strata of air separating the areas of opposite electrical charge. The phenomenon also arises between a positively charged portion of a thundercloud and a negatively charged area on the ground.

Before the actual lightning strike can occur, a descending "channel" is generated, also called a "leader", of negatively charged air molecules in the direction towards the ground. Often, the leader propagates gradually downwards in steps of 20 to 100 m and is therefore referred to as a "stepped leader". When this leader is sufficiently close to the ground, the intensified electrical field between the end of the descending leader and the ground generates one or more upward leaders of positively charged air molecules towards the descending leader. These upward leaders usually extend upward from objects projecting from the ground, for example wind turbines, trees, buildings, flag poles etc. When the two leaders meet, the system short-circuits and the actual main charge of the lightning, also referred to as a "return stroke" occurs. The phenomenon can likewise occur in reverse order, where the leader, also referred to as the "stepped leader", propagates from the ground or particularly high objects on the ground and moves towards the charged area of the thundercloud.

DE 4436197 A1 discloses a solution where a lightning current is diverted from the pitch bearing and into the nacelle through a lightning conductor member defining spark gaps with the lightning down-conductor of the blade and an electrically conducting ring on the nacelle, respectively. Electric arcs are generated by the lightning strikes in these spark gaps with the effect that the lightning current can be conducted downwards into the ground. Thus, electrical connections are only generated between the lightning down-conductor of the blade and the ground during the main charge of the actual lightning strike where electrical arcs are generated in the spark gaps. As mentioned previously, leaders are generated prior to the actual main discharge, and the electrical isolation between the blade and the nacelle implies that there is a risk of the leaders passing through other uncontrollable paths between the individual structural members—for instance from the nacelle through the main shaft bearing or the rotor bearings to the rotor hub and from there through the pitch bearing of the blade to the lightning down-conducting arrangement of the blade. Subsequent to the formation of electrical leaders passing through possible uncontrollable paths in for example the structural members, the main discharge of the lightning or parts thereof follows the path of the leader generated through the structure to the ground. Such a main discharge or parts thereof may cause minor or major damages on the structure or parts thereof when it is not guided through a lightning down-conductor in a controllable way.

WO 01/86144 A1 discloses a wind turbine with a spark gap between a lightning down-conductor in the blade and the nacelle, and for where an electrical connection exists between the lightning down-conductor and the rotor hub for a continuous electrostatic discharge of the blade. In this structure, the pitch bearing of the blade is not protected against being passed by a discharge current.

DISCLOSURE OF INVENTION

The object of the invention is to provide an improved lightning down-conducting arrangement for a wind turbine which ensures to a maximum extent that the lightning strikes in the receptors of the blade or the outer lightning down-conductors so as subsequently to be guided safely to the ground through the lightning down-conducting arrangement without causing damage to the wind turbine. A further object is to protect the pitch bearings against electrical currents.

The object of the invention is obtained by providing a sliding contact connection parallel to the spark gap between the lightning down-conductor and the rotor hub, said sliding contact connection ensuring an electrical contact between said lightening down-conductor and said rotor hub irrespective of the pitch angle of the blade. In this way, a permanent electrical connection can be obtained between the lightning down-conductor of the blade and the rotor hub. Furthermore, upward leaders can be generated from the receptors of the blade or the outer lightning down-conductors with the result that the probability of lightning striking in the receptor or in the outer lightning conductors has been optimised. During the actual main discharge, the so-called return stroke, where a very strong current flows within a very short period of time, an electric arc is simultaneously generated in the spark gap due to the very strong electrical potential applying after the short circuiting of the leaders. As a result the electrical resistance is very weak in the spark gap with the result that the lightning current passes through the spark gap to the ground. As the electrical resistance in the spark gap is much weaker than the contact resistance in the sliding contact connection, only a small non-destructive portion of the lightning current passes through the sliding contact connection. The sliding contact connection ensures that a permanent electrical connection applies between the lightning down-conductor of the blade and the rotor hub irrespective of the pitch angle of the blade. The pitch bearing is completely protected against the passing of current and is thereby ensured a prolonged life because no sparkovers and migrations of material occur between the pitch bearing members.

According to an advantageous embodiment, the sliding contact connection includes a collector shoe fixedly mounted on the rotor hub, and an electrically conducting contact member being connected to the lightening down-conductor of the blade and extending along a portion of the circumference of the blade root. This embodiment is particularly simple as the blade root is usually cylindrical, whereby the point of contact between the contact member and the collector shoe is in a constant position, irrespective of the pitch angle of the blade.

According to an alternative embodiment, the sliding contact connection includes a collector shoe fixedly mounted on the blade root, and an electrically conducting contact member in form of a rail mounted on the rotor hub.

According to a preferred embodiment, the spark gap is provided between the contact member and a spark gap member. This embodiment is particularly simple because the contact member is used for both the sliding contact connection and the spark gap connection.

According to a particularly advantageous embodiment, the collector shoe and the spark gap member are combined in one contact unit, thereby obtaining a particularly simple and compact structure which is easily maintained or replaced.

The lightning down-conductor is advantageously connected to a lightning receptor adjacent the tip of the blade.

The invention also relates to a wind turbine including a nacelle, a rotor shaft and a wind turbine rotor, as described above.

According to an embodiment, the rotor hub includes an electrically conducting rotor hub conductor which is connected to the portion of the spark gap arranged on rotor hub side, and which through an additional spark gap is connected to an electrically conducting nacelle conductor mounted on the nacelle.

The rotor hub conductor may be electrically connected to the portion of the slide contact connection arranged on the rotor hub side, and through an additional sliding contact connection said rotor hub connector may be connected to the nacelle conductor.

According to an embodiment, the nacelle conductor may be formed by an annular contact member arranged coaxially with the rotor shaft, the rotor hub conductor being connected to an additional spark gap member and an additional collector shoe which defines the additional spark gap and the additional sliding contact connection, respectively, between the nacelle conductor and the annular contact member.

The rotor hub conductor may be electrically isolated from the rotor shaft.

BRIEF DESCRIPTION OF THE DRAWINGS

The invention is explained in detail below by means of a preferred embodiment shown in the drawings, in which.

Figure 1:
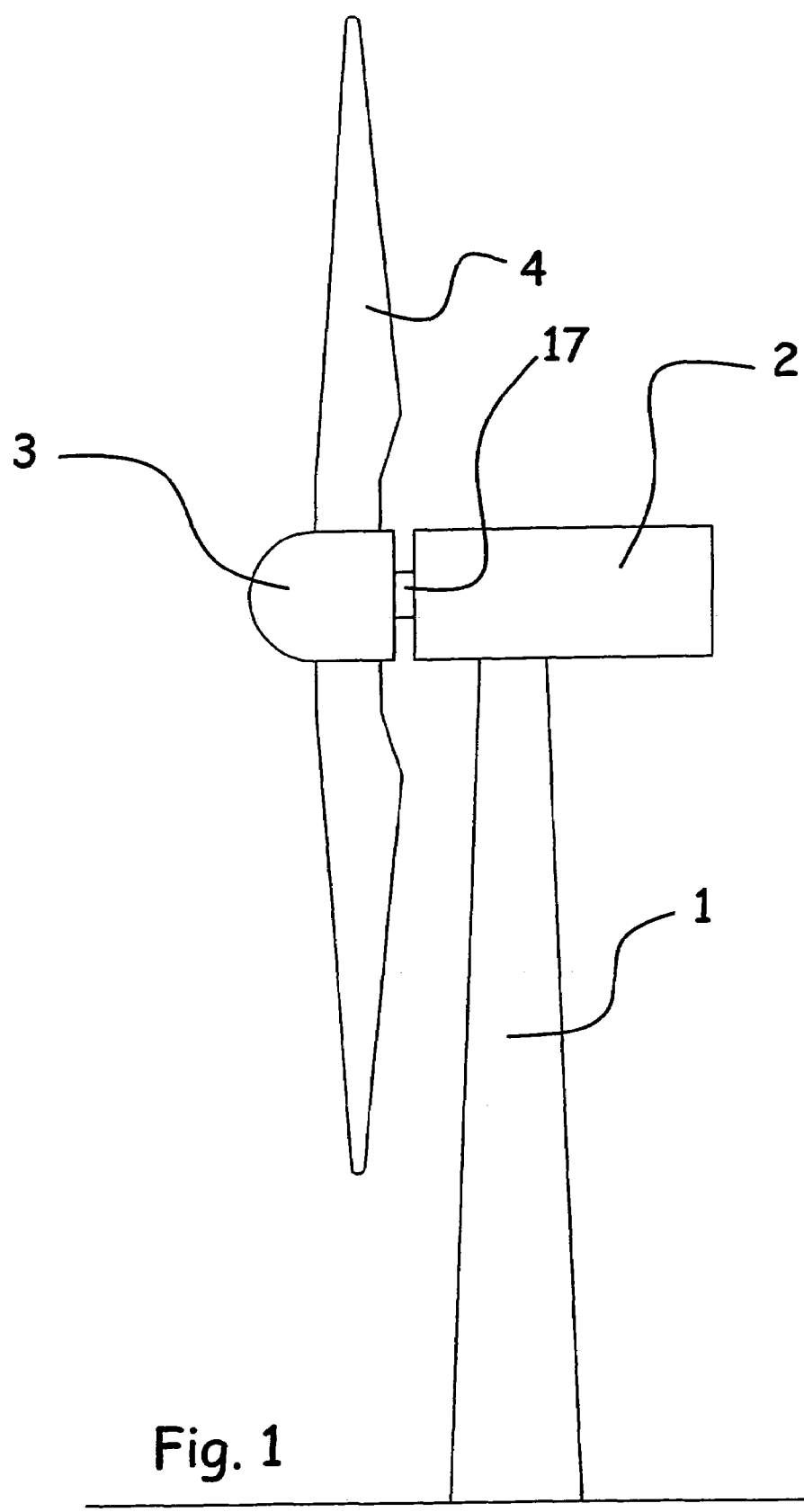
FIG. 1 is a side view of a principle sketch of a wind turbine.

The FIGS. 1 to 4 described below are designated the following reference numerals:

1 Wind turbine tower
2 Nacelle/turbine top section
3 Rotor hub
4 Blade
5 Pitch bearing
6 Inner lightning down-conductor
7 Contact member
8 Contact unit
9 Mounting arm for the contact unit
10 Mounting fittings
11 Spark gap member
12 Collector shoe
13 Mounting plate for the spark gap member and the collector shoe
14 Spacer
15 Spark gap
16 Blade root
17 Rotor shaft

BEST MODES FOR CARRYING OUT THE INVENTION

FIG. 1 shows a wind turbine where a nacelle/turbine top section 2 is conventionally mounted on the tower 1, a generator and a gear being mounted in said nacelle. A rotor shaft 17 projects from the nacelle 2, the rotor hub 3 of the wind turbine being mounted on said rotor shaft. The blades 4 of the wind turbine are mounted on the rotor hub 3.

Figure 2:
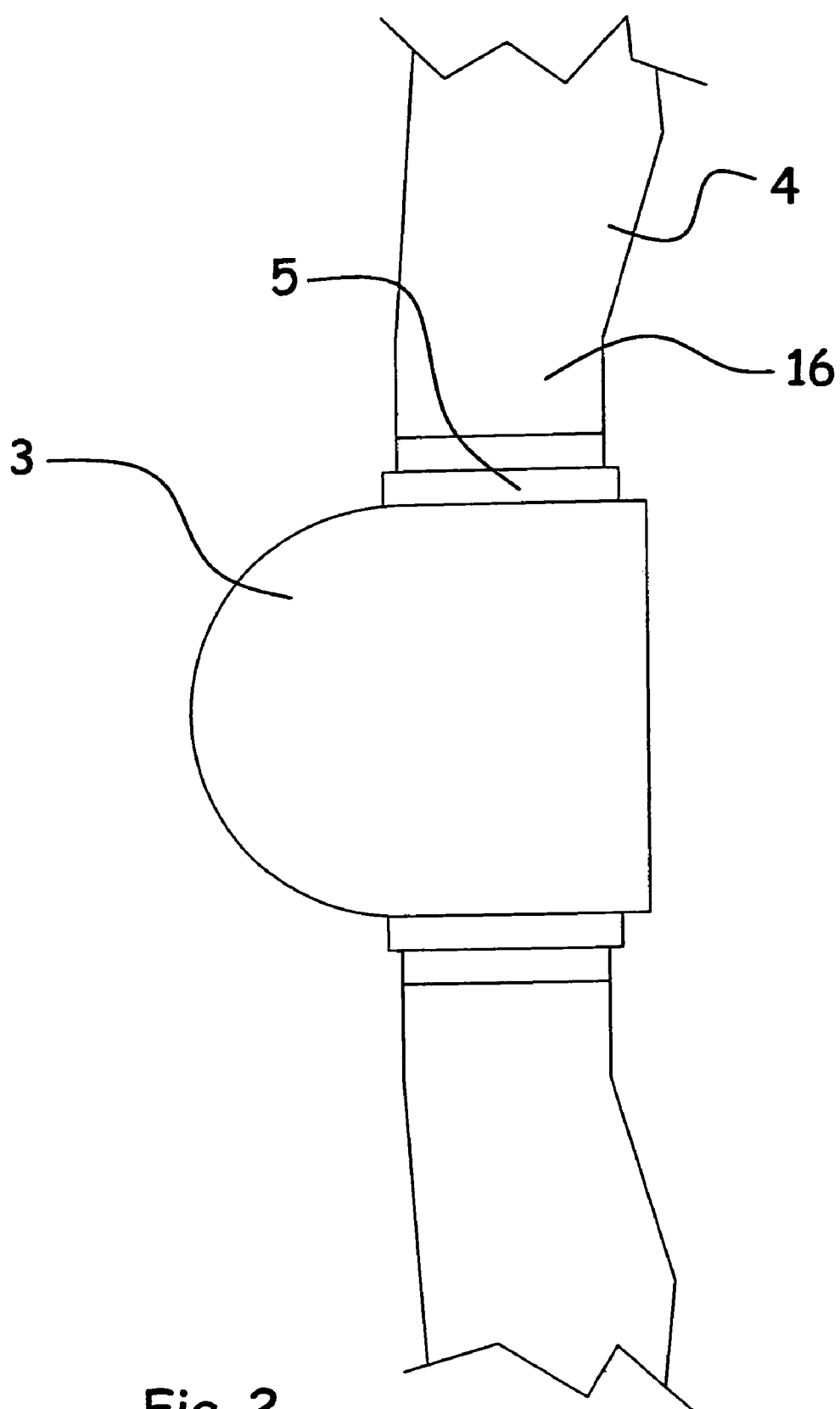
FIG. 2 is a detailed view of a rotor hub for a wind turbine, portions of two blades being shown.

FIG. 2 shows a detailed view of a rotor hub 3 for a wind turbine as well as portions of two blades 4. In the structure shown, the blades 4 and the rotor hub 3 are connected through pitch bearings 5, and the position of the blades 4 is adjustable about their longitudinal axes, i.e. the pitch angle, by means of said bearings.

Figure 3:
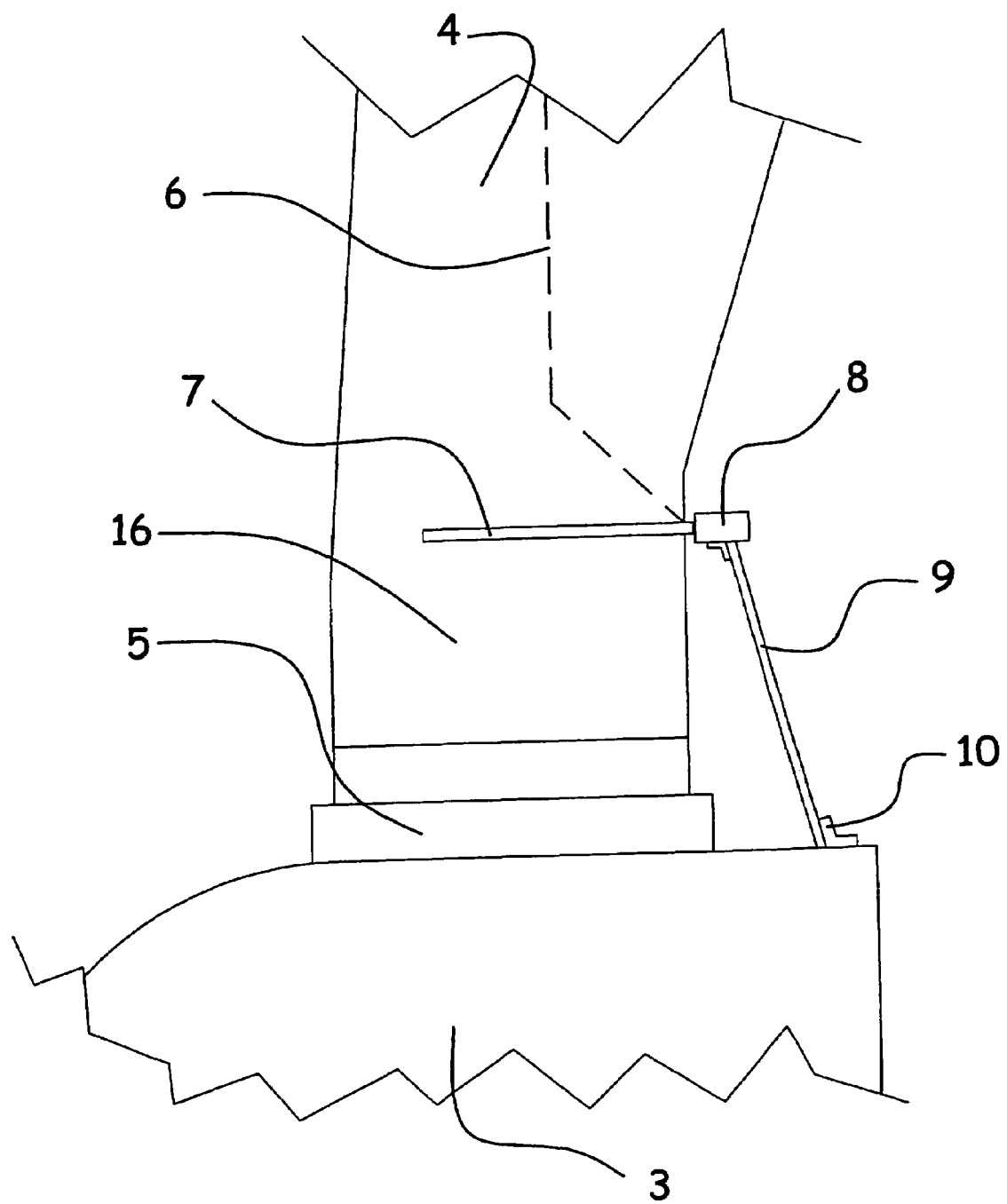
FIG. 3 is a detailed sectional view of a rotor hub and a blade with a lightning down-conducting arrangement.

In order to intercept and guide a lightning strike to the ground, an inner lightning down-conductor 6 is mounted inside the blade 4, cf. FIG. 3, said lightning down-conductor being connected at the tip of the blade 4 to one or more lightning receptors not shown. Adjacent the pitch bearing 5, this inner lightning down-conductor 6 is in direct electrical contact with a contact member 7 mounted on the outer side of the blade 4 in the embodiment shown. This contact member 7 presents an abutment face for an externally mounted contact unit 8 having a spark gap device and a sliding device fixedly mounted on the rotor hub 3 through a mounting arm 9 and mounting fittings 10.

Figure 4:
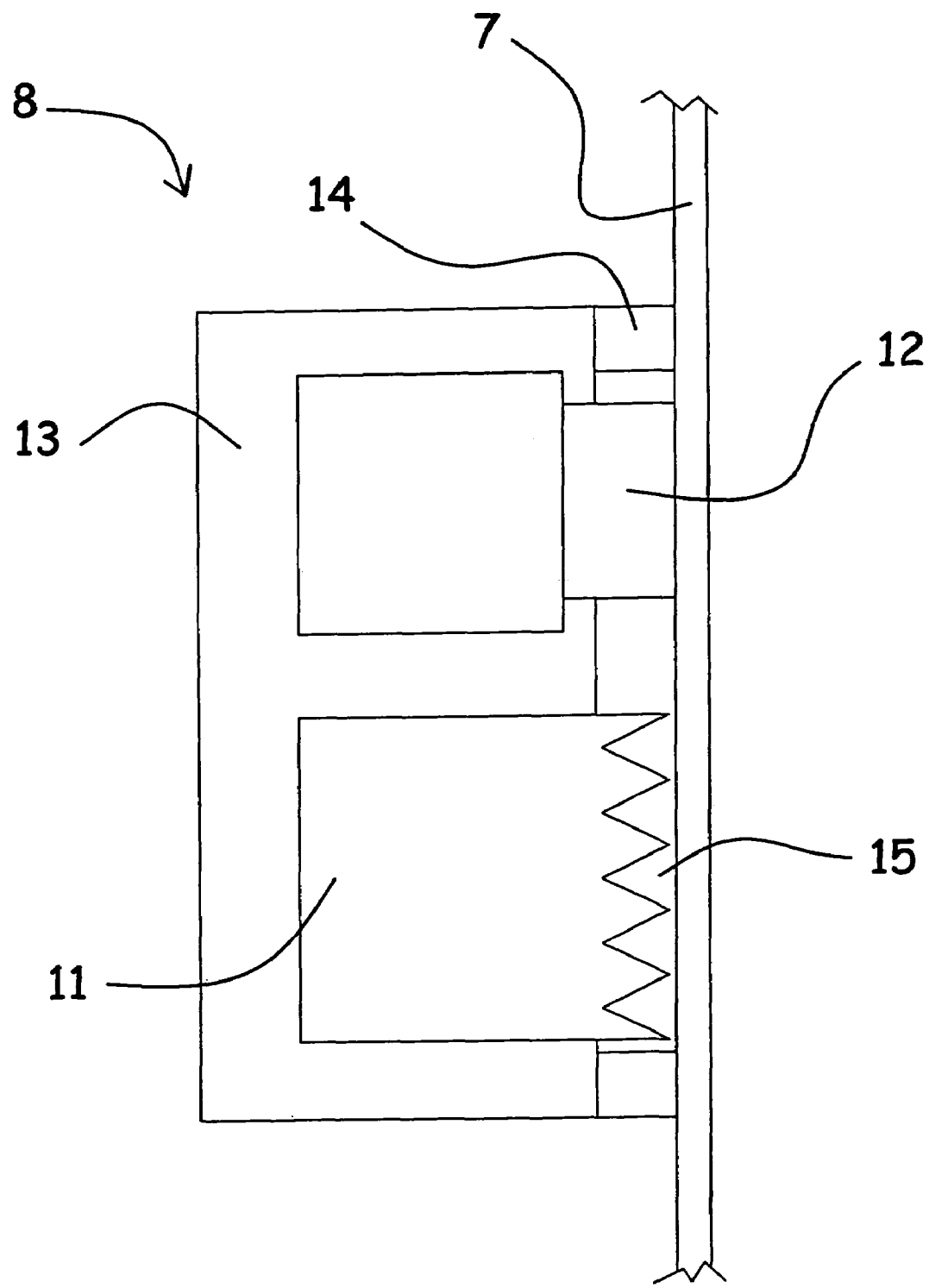
FIG. 4 is a detailed view showing an embodiment of a lightning down-conducting arrangement according to the invention.

FIG. 4 shows in detail how a contact unit 8 includes a mounting plate 13, a spark gap member 11 and a collector shoe 12 being mounted on said mounting plate 13. The contact unit 8 is mounted at the end of the mounting arm 9 in such a manner that the contact unit 8 subjects the surface of the contact member 7 to an elastic force. In order to prevent the spark gap member 11 from coming into direct contact with the contact face 7, spacers 14 are mounted between the mounting plate 13 and said contact face 7.

The contact member 7 is typically made of metal and can be shaped as an elongated member of a height—seen in the longitudinal direction of the blade—typically smaller than the width of the member. This member can be mounted flatly on the cylindrical surface of the blade root 16 and is connected to the inner lightning down-conductor 6 in the blade.

Together the spark gap member 11, the contact member 7 and the spacers 14 define a spark gap 15 of 1 to 10 mm. The surface of the spark gap member 11 facing the contact member 7 is serrated as shown. As a result, the concentrations of the flux lines around the tips of the spark gap member are reinforced, which facilitates the ignition of the electric arc in the spark gap.

The contact member 7 can extend all the way round the cylindrical blade root 16, but in principle it need only extend over 90° to 100° of the circumference of the blade root, which corresponds to the usually adjustable interval of the blade.

The collector 12 can be made of a carbon brush or be shaped as a brush or a spring-loaded shoe and be made of for example graphite, bronze, brass or carbon fibre.

According to an alternative embodiment of an arrangement as herein described, the entire arrangement can be reversed so that the collector shoe 12 and the spark gap member 11 are mounted on the blade, and the contact member 7 is mounted on the rotor hub. Thus, the contact member 7 can be shaped as a curved rail extending parallel to and at a distance from the surface of the blade root. Furthermore, the arrangement can function as both an inner solution where the entire equipment is mounted inside the blade and the rotor hub, or on the outer face of said blade and the rotor hub as described above.

The contact member 7 is shaped so that the pitch angle of the blade is freely adjustable while maintaining a good electrical connection. This good electrical connection is necessary for ensuring the formation of leaders from the receptors of the blade in connection with lightning strikes. The electrical connection also protects against unintentional spark flashovers in other places in the structure while ensuring a controlled discharge of static charges from the blade to the rotor hub, said charges being generated by the rotation of the blade through the air.

The electrical potential of the leader is present during initial stage of the lightning process and is not always sufficiently high for generating an electric arc in the spark gap 15, but passes instead through the sliding device. When the leader has "intercepted" a lightning, the electrical potential across the distance in the spark gap is sufficient for breaking down the isolation between the spark gap member and the contact member 7 of the blade due to the strong increase in the electrical potential during the main discharge of the lightning. As a result an electric arc is lit between the spark gap member 11 and the contact member 7. During the entire discharge period of the main discharge, the electric arc presents a weaker electrical resistance than the sliding device, whereby the main discharge is discharged across the spark gap. Therefore the sliding device is protected during the main discharge phase due to the increased electrical resistance thereof compared to the lit spark gap.

It is possible to guide the current applying during the initial stage of the lightning process and during the actual main discharge to the ground through the rotor shaft 17, further on from the rotor shaft to the nacelle 2 through the shaft bearing or a sliding contact connection, from the nacelle to the tower through the yaw bearing or yet another sliding contact connection, and through the tower down to the ground. A spark gap can also be established between the rotor shaft 17 and the nacelle 2 and between the nacelle and the tower.

Alternatively, an additional spark gap connection and an additional sliding contact connection 2 can be established between the rotor hub 3 and the nacelle 2. The spark gap connection and the sliding contact connection between the blade 4 and the rotor hub 3 and the additional spark gap connection and the additional sliding contact connection between the rotor hub 3 and the nacelle 2 can thus be interconnected through a rotor hub conductor electrically isolated from the rotor shaft 17. In this way, it is avoided that current flows in the rotor shaft with the effect that the bearings of the rotor shaft are not strained.

It is also possible to establish a spark gap connection and a sliding contact connection in parallel between the nacelle 2 and the tower 1.

The invention is not limited to the above embodiments.

The invention claimed is:

1. A wind turbine rotor including a rotor hub (3) and a plurality of blades (4), and where each blade root (16) is connected to said rotor hub through a pitch bearing (5) in such a manner that the pitch angle of the blade is adjustable by a turning of the blade about its longitudinal axis relative to the rotor hub, and where the blade is provided with at least one electrically conducting lightening down-conductor (6) extending in the longitudinal direction of the blade to the blade root and being electrically isolated from the pitch bearing (5), and where a spark gap (15) is provided between the lightning down-conductor and the rotor hub, said spark gap (15) being adapted to conduct a lightning current passing through the lightning down-conductor to the rotor hub, characterised in that a sliding contact connection (7, 12) is provided parallel to the spark gap (15) between the lightning down-conductor (6) and the rotor hub (3), said sliding contact connection ensuring electrical contact between said lightening down-conductor (6) and said rotor hub (3) irrespective of the pitch angle of the blade.

2. A wind turbine rotor according to claim 1, characterised in that the sliding contact connection includes a collector shoe (12) fixedly mounted on the rotor hub (3), and an electrically conducting contact member (7) connected to the lightening down-conductor (6) of the blade and extending along a portion of the circumference of the blade root (16).

3. A wind turbine rotor according to claim 2, characterised in that the spark gap (15) is provided between the contact member (7) and a spark gap member (11).

4. A wind turbine rotor according to claim 3, characterised in that the collector shoe (12) and the spark gap member (11) are combined in one contact unit (8).

5. A wind turbine rotor according to claim 4, characterised in that the lightning down-conductor (6) is connected to a lightning receptor adjacent the tip of the blade.

6. A wind turbine rotor according to claim 3, characterised in that the lightning down-conductor (6) is connected to a lightning receptor adjacent the tip of the blade.

7. A wind turbine rotor according to claim 2, characterised in that the lightning down-conductor (6) is connected to a lightning receptor adjacent the tip of the blade.

8. A wind turbine including a nacelle (2), a rotor shaft (17) and a wind turbine rotor according to claim 2.

9. A wind turbine rotor according to claim 1, characterised in that the sliding contact connection includes a collector shoe

(12) fixedly mounted on the blade root (16), and an electrically conducting contact member (7) in form of a rail mounted on the rotor hub (3).

10. A wind turbine rotor according to claim 9, characterised in that the spark gap (15) is provided between the contact member (7) and a spark gap member (11).

11. A wind turbine rotor according to claim 9, characterised in that the lightning down-conductor (6) is connected to a lightning receptor adjacent the tip of the blade.

12. A wind turbine including a nacelle (2), a rotor shaft (17) and a wind turbine rotor according to claim 9.

13. A wind turbine rotor according to claim 1, characterised in that the lightning down-conductor (6) is connected to a lightning receptor adjacent the tip of the blade.

14. A wind turbine including a nacelle (2), a rotor shaft (17) and a wind turbine rotor according to claim 1.

15. A wind turbine according to claim 14, characterised in that the rotor hub (3) includes an electrically conducting rotor hub conductor connected to the part (7; 11) of the spark gap (15) which is arranged on the rotor hub side, said rotor hub conductor further being connected through an additional spark gap to an electrically conducting nacelle conductor mounted on the nacelle (2).

16. A wind turbine according to claim 15, characterised in that the rotor hub conductor is electrically connected to the part (7; 12) of the slide contact connection which is arranged on the rotor hub side, said rotor hub conductor further being connected to the nacelle conductor through an additional sliding contact connection.

17. A wind turbine according to claim 16, characterised in that the nacelle conductor includes an annular contact member arranged coaxially with the rotor shaft (17), and that the rotor hub conductor is connected to an additional spark gap member and an additional collector shoe which defines the additional spark gap and the additional sliding contact connection, respectively, between the nacelle conductor and the annular contact member.

18. A wind turbine according to claim 15, characterised in that the rotor hub conductor is electrically isolated from the rotor shaft (17).

19. A wind turbine rotor comprising:
a rotor hub;
at least one blade having a blade root;
at least one pitch bearing, each of the at least one blade being connected to the rotor hub through a respective one of the at least one pitch bearing so that a pitch angle of the blade is adjustable by a turning of the blade about its longitudinal axis relative to the rotor hub;
an electrically conducting lightening down-conductor extending in the longitudinal direction of the blade to the blade root and being electrically isolated from the pitch bearing;
a spark gap provided between the lightning down-conductor and the rotor hub, said spark gap being adapted to conduct a lightning current passing through the lightning down-conductor to the rotor hub; and
a sliding contact connection provided parallel to the spark gap between the lightning down-conductor and the rotor hub, said sliding contact connection ensuring electrical contact between the lightening down-conductor and the rotor hub irrespective of the pitch angle of the blade.

* * * * *

UNITED STATES PATENT AND TRADEMARK OFFICE
CERTIFICATE OF CORRECTION

PATENT NO. : 7,390,169 B2
APPLICATION NO. : 10/534769
DATED : June 24, 2008
INVENTOR(S) : Flemming Møller Larsen and Lars Bo Hansen It is certified that error appears in the above-identified patent and that said Letters Patent is hereby corrected as shown below:

Title Page

The spelling of the Assignees residence should read as follows:

--(73) Assignee: LM Glasfiber A/S, Lunderskov (DK)

Signed and Sealed this

Twenty-sixth Day of August, 2008

JON W. DUDAS
*Director of the United States Patent and Trademark Office*